Jan. 7, 1958 W. J. TELL 2,818,933
VEHICLE COWL WITH TWO PORTION INSTRUMENT PANEL
Filed Aug. 24, 1953

INVENTOR
William J. Tell
BY
ATTORNEY

United States Patent Office 2,818,933
Patented Jan. 7, 1958

2,818,933

VEHICLE COWL WITH TWO PORTION INSTRUMENT PANEL

William J. Tell, Birmingham, Mich., assignor to General Motors Corporation, Detroit, Mich., a corporation of Delaware Application August 24, 1953, Serial No. 375,867

3 Claims. (Cl. 180—90)

This invention relates to instrument panels which may be associated with cowls for vehicles and more particularly to instrument panels, each having one portion which is adapted to support the instruments and one portion which is readily removable thereby giving access to the instrument connections.

In the modern automobile the forward part of the body, supporting the rear of the hood and the windshield and housing the pedals and instrument panel, is considered to be the cowl and it is to this structure that the present invention pertains giving particular reference to the relationship of an instrument panel therewith.

At the present stage of automobile development, upwardly and rearwardly sloping windshields are commonly used and the instrument panel is spaced a considerable distance rearwardly from the base of the windshield. Instruments mounted on the instrument panel have increased in number and their operative connections require appreciable space. Glove compartments, heating ducts, vents, radios and controls also require considerable space behind instrument panels. Access to the instrument connections has accordingly become exceedingly difficult because of the crowding together of these various items and also because of the difficult angles through which the connections must be reached. Provision has heretofore been made to gain access either through a ventilator cover forward of the windshield or through openings made in the fire wall leading from the engine compartment. Despite such expedients, installation of instruments and repair or replacement of the same has been an awkward, difficult, time-consuming and costly procedure not conducive to excellence in results.

Applicant has dicovered that the automobile of modern design provides an opportunity heretofore overlooked by means of which access to the instrument connections may be improved substantially. To this end he has provided a removable upper shelf-like portion extending beneath the windshield and forming a part of the instrument panel. By making the instrument panel in two sections or portions, one being removable, a large opening is provided whereby access to the instruments may be had while retaining a support for the instruments as a permanent and rigid structural member of the cowl on a vehicle body.

It is an object of the present invention to provide a cowl with a windshield and an improved instrument panel, the cooperative relationship of which facilitates access to the instrument connections. It is a further object of the invention to provide an improved instrument panel, a portion of which may be removed to promote ease of access to the space behind the panel without disturbing the structural rigidity of the cowl or the mountings of the instruments.

A feature of the invention resides in a vehicle cowl employing an instrument panel formed in two portions defining a space between them, one of the portions being shelf-like, elongated, of substantial width and removable through the use of releasable fastening means. Another feature of the invention is an instrument panel having a first or upper shelf-like sheet-metal portion with a rearwardly directed blunt edge and which is attached at an angle to a second or lower sheet-metal instrument carrying portion by means of releasable fastenings.

These and other important features of the invention will now be described in detail in the specification and then pointed out more particularly in the appended claims.

Figure 1:
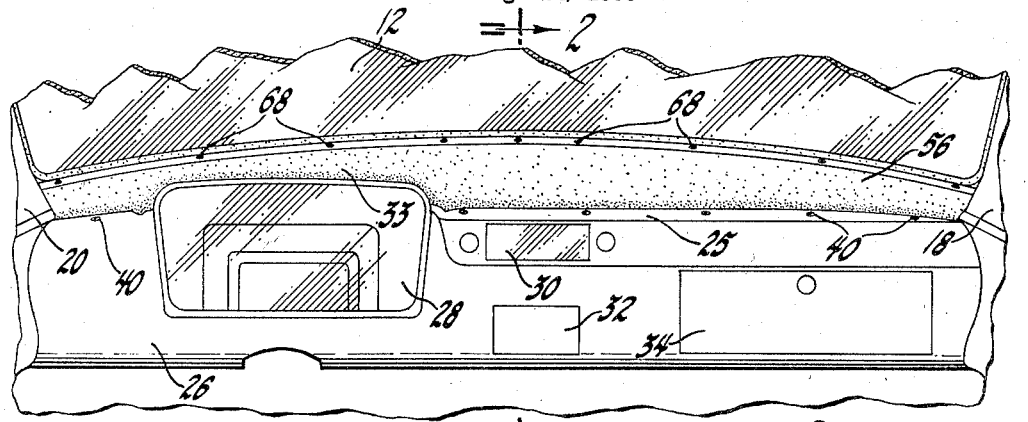
Figure 1 is an elevational view of an instrument panel in which the present invention is embodied, a portion of a windshield and a part of the fire wall in an automobile being shown.
Figure 2:
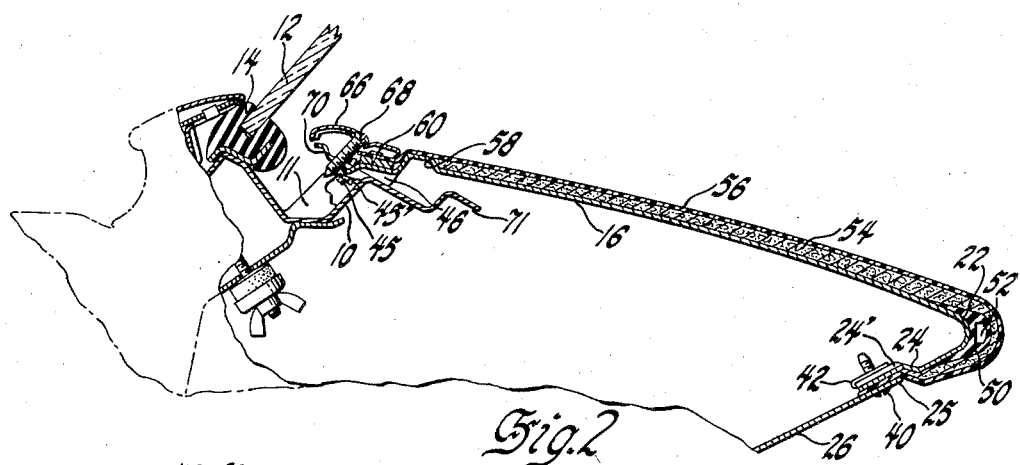
Figure 2 is a sectional view drawn to a larger scale and taken along the line 2—2 of Figure 1.
Figures 3, 4, 5:
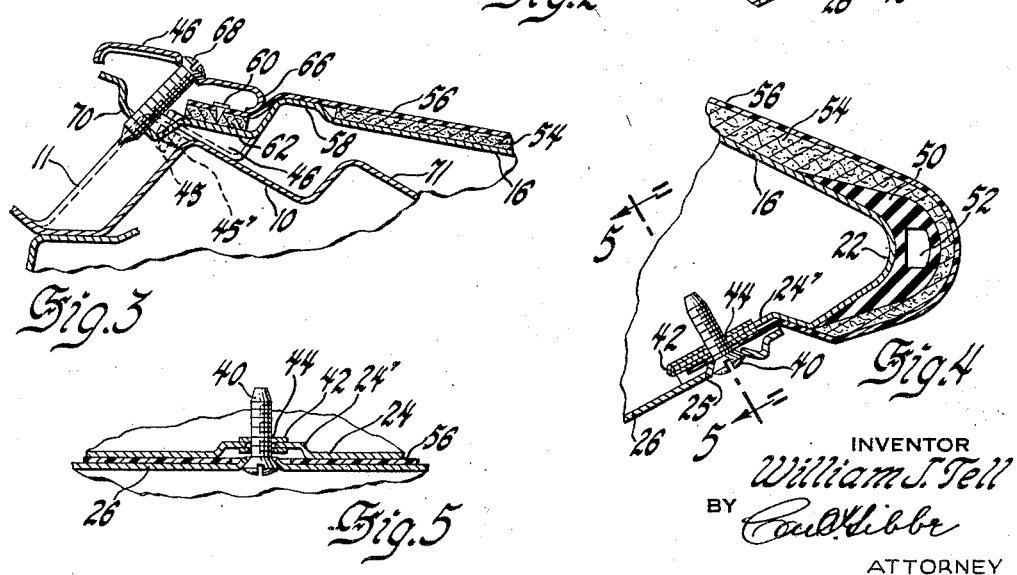
Figure 3 is a sectional view of a portion shown in Figure 2 and drawn to a still larger scale.
Figure 4 is a sectional view similar to a part of Figure 2 but drawn to a larger scale and taken through one of the fasteners.
Figure 5 is a sectional view taken along the line 5—5 of Figure 4.

A portion of a vehicle cowl 10 is shown in Figures 2 and 3, and an upwardly and rearwardly inclined windshield 12 is mounted thereon with the lower edge thereof embedded in a groove formed in a rubber strip 14. Extending beneath the windshield 12 is an elongated shelf-like sheet-metal panel portion 16 which is of substantial width and extends transversely of the car from one door 18 (Fig. 1) to the other door 20. This upper panel portion 16 extends rearwardly from near the base of the windshield 12 and is bent to form a rearwardly directed blunt edge 22 and a forwardly and downwardly inclined margin 24 which is placed in over-lapping relation with the upper margin 25 of a lower portion 26 of the instrument panel. This portion 26 is rigidly affixed to the cowl by means not shown and is adapted to support instruments such as diagrammatically represented at 28, 30 and 32. The ends of the portion 26 may be welded to the cowl or fixed thereto in any conventional manner. A device such as a glove compartment door 34 is also accommodated by the lower portion 26. It will be appreciated that the portion 26 may be shaped in various forms properly to support the instruments for observation. Fig. 1 shows a suitable arrangement which may be modified for use of the present invention. The shelf-like portion 16 is so formed that a part 33 of the blunt edge 22 is arched upwardly to conform with the outline of the casing of the instrument 28.

Releasable fastening means such as screws 40 and suitable clips 42 are provided to attach the overlapping margin 24 of the shelf-like portion 16 to the lower portion 26. Preferably, and as shown, the margin 24 is indented as shown at 24' in Figs. 4 and 5 and at six spaced points. At each of these points a clip 42 is easily slipped over one of the indented margin portions 24' and this clip is suitably threaded as at 44 to receive a screw 40. As clearly seen in Figs. 2 and 4, the screws 40 are partially concealed from occupants of the vehicle by the overhanging lip or blunt edge of the upper panel portion 16 and its covering to be described hereinafter.

The forward margin of the upper panel portion 16 is held in place on the cowl 10 by means of releasable fastening means such as six spaced bolts 45 only one of which is shown. Each of these bolts 45 passes down through an offset part 46 of the portion 16 and an offset part 11 of the cowl 10 and is threaded into a nut 45' welded to the underside of the offset part 11.

Preferably the blunt rearwardly directed edge 22 of the instrument panel is provided with an extruded rubber strip 50 which conforms therewith and this strip is advantageously provided with a longitudinal air channel 52, To give over all softness to the panel, a layer of cotton or other equivalent material 54 is interposed between the metal upper portion 16 with its rubber strip 50 taken as a unit and an anti-glare covering 56 of a leather-like plastic material.

As seen in Figure 3, the sheet-metal upper portion 16 is so made as to present a ridge 58 near its forward margin thus partially defining a space for the forward portion of the soft cotton material 54 so that the covering 56 may be pulled taut and lie smoothly in place. The covering 56 conveniently is drawn tightly over the ridge 58 and is attached by means of tacks 60 to a fibrous strip 62. The strip 62 and the margin of the material 56 are held in place on the panel portion 16 by means of a curved molding 66 and nine spaced screws 68 which are threaded into forwardly extending margin parts 70 of the portion 16.

It will be noted that the shelf-like portion 16 is removable because of the releasable fastenings 40 and 45 and that it is of sufficient dimensions lengthwise as well as transversely of the car so that its removal permits a worker to insert both arms, if need be, through the space defined by the upper margin 25 of the lower panel portion 26 and the rearmost lip 71 of the cowl 10. This removal admits light and permits access to the instruments 28, 30, 32 and the connections leading therefrom.

The material 56 covering the removable panel portion 16 is preferably made of non-reflective or non-glare material to minimize reflections from the surface of the windshield 12. The rubber strip 22 is not essential but is preferred because of its buffer or slight cushioning action in the event of inadvertent impact by any part of the body of a vehicle occupant with the instrument panel.

Having described my invention what I claim is new and desire to secure by Letters Patent of the United States is:

I claim:

1. A vehicle cowl including a windshield and an instrument panel, said instrument panel being spaced rearwardly from said windshield and comprising a lower portion with its ends fixed to said cowl as a permanent structural member thereof and a removable upper shelf-like portion, said lower portion serving as a support for instruments, and releasable fastening means holding the forward margin of said upper portion to said cowl along and adjacent the base of said windshield and additional fastening means securing a rearward part of said upper portion to the top margin of said lower portion.

2. A vehicle cowl with a windshield and an instrument panel, said instrument panel extending rearwardly from the base of the windshield and comprising a removable upper shelf-like portion having a rearwardly extending blunt edge with a downwardly and forwardly extending margin and a lower portion for supporting instruments, said portions defining a space between them, said lower portion having an upwardly and rearwardly extending margin attached to said first mentioned margin by releasable fastenings.

3. An instrument panel including elongated lower and upper portions forming rear and top walls of a cowl chamber in a vehicle such as an automobile, said lower portion being a permanent structural member of said vehicle and serving as a support for instruments utilized in operating said vehicle, said upper portion extending in a forward direction from an upper lengthwise margin of said lower portion and removable for access to said chamber and connections to said instruments, and releasable means attaching said upper portion in position.

References Cited in the file of this patent

UNITED STATES PATENTS

| | | |
|---|---|---|
| 1,848,377 | Novelli | Mar. 8, 1932 |
| 2,070,760 | Straith | Feb. 16, 1937 |
| 2,207,224 | Meares | July 9, 1940 |
| 2,720,932 | Arpels | Oct. 18, 1955 |